(12) United States Patent
Oe

(10) Patent No.: US 6,951,025 B2
(45) Date of Patent: Sep. 27, 2005

(54) GAS DYNAMIC PRESSURE BEARING, SPINDLE MOTOR COMPRISING A GAS DYNAMIC PRESSURE BEARING, AND RECORDING DISK DRIVE DEVICE AND POLYGON SCANNER COMPRISING A SPINDLE MOTOR

(75) Inventor: Takayuki Oe, Inugami-gun (JP)

(73) Assignee: Nidec Corporation, Kyoto (JP)

( * ) Notice: Subject to any disclaimer, the term of this patent is extended or adjusted under 35 U.S.C. 154(b) by 274 days.

(21) Appl. No.: 10/249,043

(22) Filed: Mar. 12, 2003

(65) Prior Publication Data
US 2003/0174911 A1 Sep. 18, 2003

(30) Foreign Application Priority Data
Mar. 12, 2002 (JP) ........................................ 2002-066391
Feb. 12, 2003 (JP) ........................................ 2003-033427

(51) Int. Cl.[7] ........................ G11B 17/028; G11B 25/04
(52) U.S. Cl. ........................................ 720/695; 369/269
(58) Field of Search ........................... 369/269; 347/134, 347/261; 310/90; 720/695, 696, 658; 384/100, 107, 112, 114, 121, 123; 360/99.04, 224, 98.07

(56) References Cited

U.S. PATENT DOCUMENTS

| | | | |
|---|---|---|---|
| 6,175,547 B1 * | 1/2001 | Kogure | 369/269 |
| 6,200,035 B1 | 3/2001 | Otsuki | 384/123 |
| 6,339,270 B1 * | 1/2002 | Ichiyama | 310/67 R |
| 6,361,214 B1 * | 3/2002 | Ichiyama | 384/107 |
| 2004/0156569 A1 * | 8/2004 | Takeuchi et al. | 384/107 |

FOREIGN PATENT DOCUMENTS

| | | |
|---|---|---|
| JP | H09-318900 A | 12/1997 |
| JP | 2000-304037 A | 10/2000 |

* cited by examiner

*Primary Examiner*—Julie Anne Watko
(74) *Attorney, Agent, or Firm*—Shinjyu Global IP

(57) ABSTRACT

A gas dynamic pressure bearing is disclosed in which dynamic pressure generating grooves in a radial bearing pump out gas toward a thrust bearing, and dynamic pressure generating grooves in the thrust bearing pump in gas toward the radial bearings. This structure generates high pressure in the lubrication gas in the connecting portions of the radial bearings and thrust bearings. In order to compensate for the movement of gas by means of this pump-out and pump-in operation, a structure is provided that links the two portions of the radial and thrust bearings where the gas pressure is reduced, or connects these two portions with the space surrounding the bearing.

24 Claims, 21 Drawing Sheets

GAS DYNAMIC PRESSURE BEARING, SPINDLE MOTOR COMPRISING A GAS DYNAMIC PRESSURE BEARING, AND RECORDING DISK DRIVE DEVICE AND POLYGON SCANNER COMPRISING A SPINDLE MOTOR

BACKGROUND OF INVENTION

1. Field of the Invention

The present invention relates to a gas dynamic pressure bearing, and more particularly to a gas dynamic pressure bearing employed in a spindle motor, a recording disk drive device, and a polygon scanner.

2. Background Information

There have been demands in recent years for increases in the rotational frequency of data recording devices such as recording disk drive devices and optical disk devices used in computers and the like. In addition, there have also been demands for polygon scanners used in digital copiers, laser printers, and the like to achieve high rotational speeds in the range of 20,000 rpm or more in order to improve print quality and to accelerate the devices that use them. The use of gas dynamic pressure bearings in the motors employed by the aforementioned devices has been proposed in order to allow the motors used therein to achieve both high rotational speeds and an extended life span.

However, the following problem has been identified with gas dynamic pressure bearings. If a gas dynamic pressure bearing does not rotate at or above a certain speed, there will not be enough dynamic pressure generated therein to prevent the bearing surfaces from coming into contact with each other. Because of this, there is a tendency to increase the torque needed for rotation during startup until the motor achieves its rated speed. Abrasion of the bearing surfaces cannot be ignored because the thrust bearing surfaces come into direct contact with each other, particularly during the initial phase of startup.

Various methods have been attempted in order to solve this problem. For example, Japanese Published Patent Application H09-318900 discloses a method of maintaining a space between the bearing surfaces when the motor is stopped, and thus making startup easier, by providing a microscopic convex portion on the bearing surfaces.

However, this method requires that the convex portion be formed with a high degree of precision. In other words, if the convex portion is too low, the surface thereof come into contact with other concave and convex portions on the bearing surfaces and thus startup torque cannot be reduced. On the other hand, if the convex portion is too high, the motor will continue to rotate with the convex portions in contact with each other, thereby severely abrading the convex portion. Thus with this method, it is difficult to reduce production costs, and there are concerns that the reliability of the bearing will be harmed due to variations in the precision thereof.

In addition, Japanese Published Patent Application 2000-87958 discloses a method which provides a convex portion on the inner circumferential side of the thrust plate in order to allow the bearing surfaces to avoid contacting each other when the motor is stopped. This method also forms a concave portion that is more shallow than the dynamic pressure generating grooves thereon, and an elevated portion that is lower than the convex portion, on the outer circumferential side of the convex portion in order to accelerate the generation of dynamic pressure when the motor starts up.

In this method, the degree of precision that the concave portion requires is less than that of the method disclosed in Japanese Published Patent Application H09-318900. However, this method increases the number of portions which require precision, such as the concave portion that is more shallow than the dynamic pressure generating grooves on the outer circumferential side of the convex portion, and the elevated portion that is lower than the convex portion. Because of this, it is difficult to reduce the cost of producing the bearing, and there are concerns that the reliability of the bearing will be harmed due to irregularities in the precision thereof.

Furthermore, Japanese Published Patent Application 2000-304037 discloses a structure that is comprised of a cylindrical structure that is coaxially inserted into a shaft, and a cylindrical sleeve that is closed on both ends thereof and which accommodates and nests the cylindrical structure therein such that it is freely rotatable therewith. Thrust dynamic pressure bearings are formed in the closing surfaces of the sleeve that face both end surfaces of the cylinder, and a radial dynamic pressure bearing is formed in the inner circumferential surfaces of the sleeve that face the lateral surfaces of the cylinder. In this structure, a gas path is provided in the portions thereof that connect the gap in the thrust dynamic pressure bearings with the gap in the radial dynamic pressure bearing, which stabilizes the rotation of the motor at low speeds.

However with this method, it is difficult to increase the rigidity of the bearing in the radial direction, and thus it is difficult to achieve the bearing performance required in a recording disk drive device and the like.

Up until now, no gas dynamic pressure bearing has been capable of satisfying demands that (a) the bearing surfaces thereof promptly move to the non-contact state at startup, (b) the manufacture thereof be simplified, and (c) the bearing have a high degree of rigidity.

SUMMARY OF INVENTION

It is an object of the present invention to provide a motor and a recording disk drive device such as a hard disk drive that promptly starts up, has a high degree of reliability, and has excellent cost performance.

In a gas dynamic pressure bearing according to one aspect of the present invention, dynamic pressure generating grooves in the radial bearing pumps out gas toward the thrust bearing, and dynamic pressure generating grooves in the thrust bearing pump in gas toward the radial bearing, thereby generating high pressure in the regions that connect the radial bearing to the thrust bearing. In order to compensate for this pump-out and pump-in operation, the portion of the radial bearing in which the gas pressure has been lowered is linked, either via a pathway via the exterior space surrounding the bearing, with the portion of the thrust bearing in which the gas pressure has been lowered. This configuration helps to avoid any shortages of gas needed to lubricate the bearing.

The high pressure regions between the radial bearing and the thrust bearing that are produced thereby make it possible to maintain a sufficient distance between the bearing surfaces during bearing rotation, and at the same time accelerate the movement of the bearing surfaces, particularly the thrust bearing surfaces, to the non-contact state when rotation begins. The high pressure regions produce support forces in the axial end of the radial bearing, and thus the rigidity of the shaft of the bearing increases with respect to moments that tilt the shaft.

More particularly, as shown in FIG. 7, if for some reason the shaft of the bearing tilts with respect to the sleeve, the pressure in the high pressure regions increase between the radial bearing and the thrust bearing on the side which has been tilted. This adds a righting moment with respect to the tilted shaft and further increases the rigidity of the bearing.

The effects of the present invention is obtained even with a bearing structure having one thrust bearing and one radial bearing. However, it is preferable that the gas dynamic pressure bearing of the present invention have two radial bearings that are separated in the axial direction and two thrust bearings on both ends thereof. In this situation, the bearing has a high degree of symmetry, and moreover, because the support forces act both on two support points in the radial direction and in the vertical thrust direction, the support is stable in both the radial and the thrust directions. In the alternative, when the sleeve has a floor on the bottom thereof, a thrust bearing is formed in this bottom floor, and a radial bearing is formed in the inner circumferential surface thereof.

Note that the aforementioned descriptions assumes a gas dynamic pressure bearing in which the shaft is the body that rotates. However, the description provided herein holds true even with a bearing in which the sleeve is the body that rotates.

According to another aspect of the present invention, a portion of the dynamic pressure generating grooves of the thrust bearing on the side near the radial bearing are eliminated, or in the alternative, the cross-sectional area of the grooves on this portion are reduced. The gas that is pumped in by the thrust bearing is compressed at this region and thus the gas pressure increases at this location. This structure exhibits this effect when the thrust bearing surfaces are in contact with each other, and even in a situation in which the thrust bearing surfaces are not in contact with each other and there is a small and insufficient amount of distance therebetween. In situations in which the distance between the bearing surfaces is extremely small, the gas pumped in by the dynamic pressure generating grooves is sent primarily to the radial bearing side via the groove portion. However, in this aspect of the present invention, the cross-sectional area of the grooves has been reduced at a portion near the radial bearing. Thus, the gas pressure increases on the thrust bearing surfaces near the radial bearing, and this helps to move the thrust bearing surfaces to the non-contact state. Thus, the torque needed during bearing startup is reduced, and moreover, abrasion in the thrust bearing surfaces is reduced.

According to another aspect of the present invention, a flat region having no dynamic pressure generating grooves therein are formed in the radial bearing on the side near the thrust bearing. This structure widens the area on the radial bearing surfaces on both ends of the shaft where the gas pressure is high, and thus increases the rigidity of the radial bearing.

According to another aspect of the present invention, the gas dynamic pressure bearing is used in a spindle motor, a recording drive device, and a polygon scanner. The gas dynamic pressure bearing of the present invention provide these devices with high rigidity, prompt startup, low power consumption, and low abrasion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWING

Referring now to the attached drawings which form a part of this original disclosure.

DETAILED DESCRIPTION

1. First Embodiment

A first embodiment of a gas dynamic pressure bearing according to the present invention will be described with reference to FIG. 1.

Figure 1:
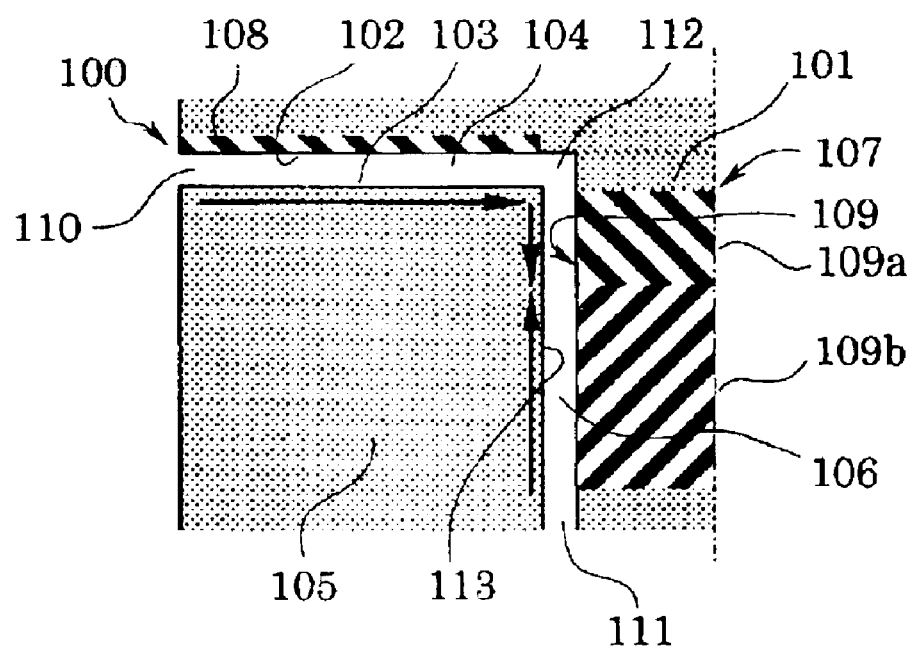
FIG. 1 is a cross-sectional view of a first embodiment of a gas dynamic pressure bearing according to the present invention.

FIG. 1 shows only the left half of a gas dynamic pressure bearing having a shaft 101 at the center thereof. A thrust bearing 100 is comprised of a thrust bearing surface 102 disposed on the shaft 101, a thrust bearing surface 103 disposed on a sleeve 105, and a gap 104 formed between the thrust bearing surface 102 and the thrust bearing surface 103 that is filled with a gas. Dynamic pressure generating grooves 108 are formed in the thrust bearing surface 102. An end portion 110 of the gap 104 is a region in which the gas pressure is reduced by means of the dynamic pressure bearing grooves 108, and forms an opening to the surrounding space to allow gas to flow in and out of the gap 104.

A radial bearing 107 is comprised of a radial bearing surface 109 disposed on the shaft 101, a radial bearing surface 113 disposed on the sleeve 105, and a gap 106 formed between the radial bearing surface 109 and the radial bearing surface 113 that is filled with a gas. Dynamic pressure generating grooves 109a and 109b are formed in the radial bearing surface 109. An end portion 111 of the gap 106 is a region in which the gas pressure is reduced by means of the dynamic pressure bearing grooves 109a and 109b, and forms an opening to the surrounding space to allow gas to flow in and out of the gap 106.

In FIG. 1, the dynamic pressure generating grooves 108 may instead be formed in the thrust bearing surface 103. Likewise, the dynamic pressure generating grooves 109a and 109b may instead be formed on the sleeve 105.

The arrow in FIG. 1 that points to the right shows the dynamic pressure generating grooves 108 acting to push gas in this direction in order to increase gas pressure. Likewise, the arrows that point up and down show the dynamic pressure generating grooves 109a, 109b increasing the gas pressure in the upward direction and the downward direction. The length of the arrows used in FIG. 1 and any of the other attached figures are proportional to the size of the force produced by the dynamic pressure generating grooves.

The force from the thrust bearing that pushes gas inward, and the force from the radial bearing that pushes gas outward, converge at a point 112 that connects the two bearings and a high pressure is generated at this point. Because this high pressure strengthens the support force of the thrust bearing, trouble such as contact between the bearing surfaces at rated rotation is reduced, and the reliability of the bearings increases. At the same time, this high pressure helps move the surfaces of the thrust bearing into the non-contact state at startup, and thus reduces the torque needed at startup.

Furthermore, in the bearing structure of the present invention, the shaft 101 tilts very little when a tilting moment is applied thereto because the rigidity of the shaft 101 is high. The same is true in situations in which the shaft is fixed and the sleeve rotates. This is due to the following two effects.

First, the pressure of the gas at the end of the shaft (position 112) increases because the radial bearing acts to increase the gas pressure toward the axial end of the shaft, and at the same time, the thrust bearing acts to increase the gas pressure toward the radial bearing. Increasing the pressure of the gas increases the rigidity of the shaft with respect to moments that attempt to tilt the shaft or the sleeve because the support force at the axial end of the shaft increases. This effect is not produced in the conventional gas dynamic pressure bearing noted above.

Second, in situations in which a tilt is produced in the shaft or the sleeve, the effect of the dynamic pressure grooves in the thrust bearing and the radial bearing is strengthened, and the pressure of the gas increases only on the tilted side, because the gap between the bearing becomes smaller on the side which is tilted. This increased pressure combines to increase the righting moment because the thrust dynamic pressure bearing and the radial dynamic pressure bearing are linked on the side in which pressure is increased. In a conventional gas dynamic pressure bearing, the pressures at the thrust bearing and the radial bearing increase in response to a tilt in the shaft, but these high pressure regions make little contribution to the righting moment because the high pressure escapes from the ends of the bearings. This effect is described in greater detail below.

Note that when the term gap is used in the present invention, it indicates a gap between the bearing surfaces that occurs when the gas dynamic pressure bearing or a spindle motor rotates, the thrust bearing and the radial bearing generate support force, and the bearing surfaces are maintained in the non-contact state. This is because there are times when a gap does not exist in, for example, the thrust bearing if one were to examine the device when stationary. However, even in the latter situation, there is enough play to allow the shaft or the sleeve to float, and the existence of this play insures that a gap is present in the bearing during rotation. In addition, even if it appears with the naked eye that there is no gap in a bearing, there are actually extremely few portions thereof that are in contact with each other if viewed at the atomic level.

2. Second to Fifth Embodiments

Second to fifth embodiments of the gas dynamic pressure bearing according to the present invention will be described with reference to FIGS. 2 to 5.

The gas dynamic pressure bearings in FIGS. 2 to 5 are identical to that shown in FIG. 1, except that (1) there is a region 120 in the dynamic pressure generating grooves on the thrust bearing in which the depth of the grooves therein is shallow, and (2) this region 120 is disposed in a position where the pressure of the gas between the thrust and radial bearings is increased by the dynamic pressure generating grooves. With this configuration, the flow of gas produced by the dynamic pressure generating grooves 108 in the surface of the thrust bearing is interrupted by the region 120, and thus high pressure is generated thereby. If the gas flow produced by the radial bearings 107, 121, 122, 125 is stronger than the gas flow produced by the dynamic pressure generating grooves 108 in the thrust bearing, the gas sent in from the radial bearing is interrupted by the region 120, and high pressure is generated thereby.

Under conditions in which the motor is at its rated rotation speed, there is little pressure generated by the region 120 because the bearing surfaces of the thrust bearing are in the non-contact state and the gap between the bearing surfaces becomes comparatively large. However, when the rotation of the gas dynamic pressure bearing begins, the surfaces of the thrust bearing are in contact with each other, and because the gap between the surfaces is extremely small, the region 120 effectively interrupts the flow of gas and generate high pressure thereby. Even if the ability of the radial bearing to push the gas during startup is stronger than that of the thrust bearing, the region 120 generates high pressure by means of the gas flow produced by the radial bearing in the same way as noted above.

Thus, a gas dynamic pressure bearing of the present invention comprised of a region 120 having shallow grooves therein promptly move the bearing surfaces to the non-contact state because a comparatively large support force in the thrust direction is produced when rotation begins.

Figure 2:
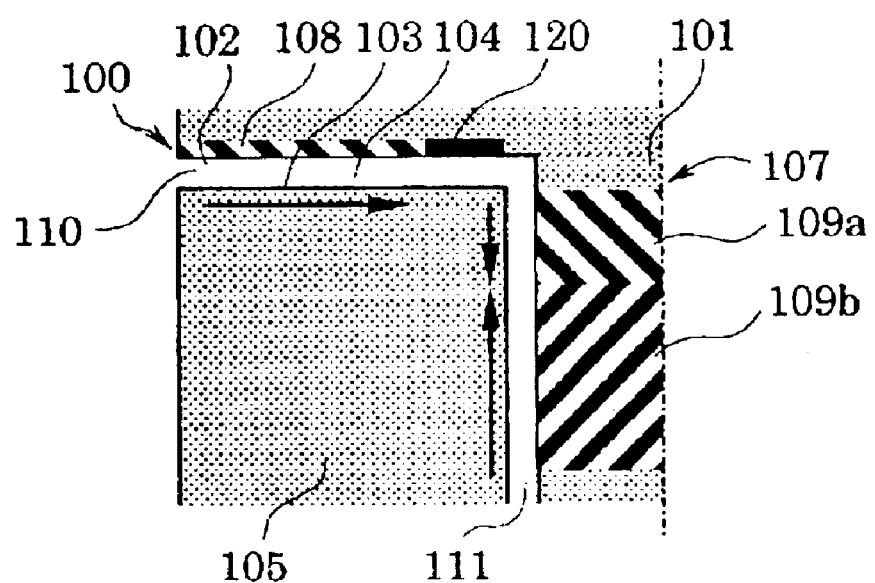
FIG. 2 is a cross-sectional view of a second embodiment of the gas dynamic pressure bearing according to the present invention.

In FIG. 2, an end portion on the shaft side of the dynamic pressure generating grooves 108 shown in FIG. 1 has been replaced with the region 120.

Figure 3:
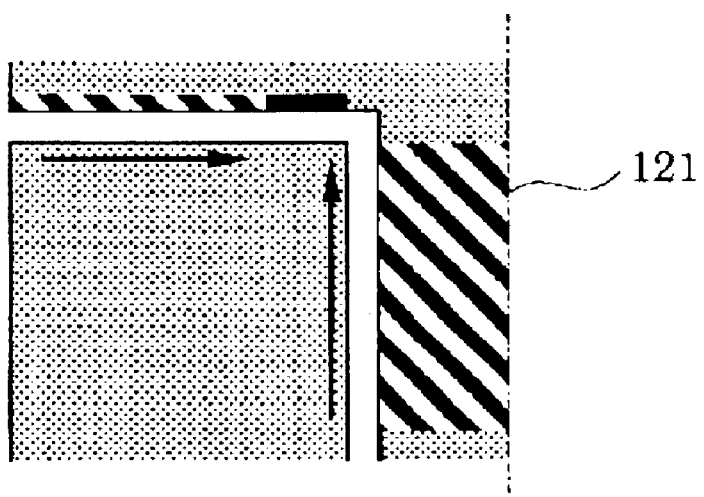
FIG. 3 is a cross-sectional view of a third embodiment of the gas dynamic pressure bearing according to the present invention.

In FIG. 3, the configuration of the thrust bearing is the same as that shown in FIG. 2, but the dynamic pressure generating grooves in the radial bearing are pump-out spiral grooves 121 that increase the gas pressure toward the axial end thereof. This structure allows an even higher increase in the gas pressure in the axial end thereof.

Figure 4:
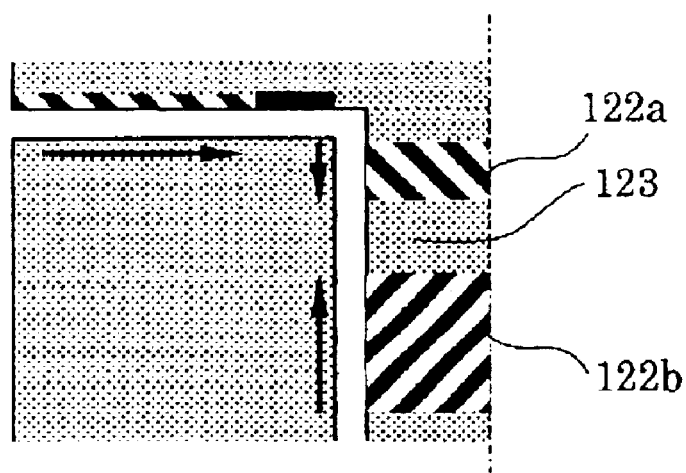
FIG. 4 is a cross-sectional view of a fourth embodiment of the gas dynamic pressure bearing according to the present invention.

In FIG. 4, the dynamic pressure generating grooves of the radial bearing shown in FIG. 2 have been divided into two portions, and a region 123 having no grooves therein has been provided therebetween. As shown by the lengths of the arrows in the figure, an upward pressure is generated by the combination of the dynamic pressure generating grooves 122a and 122b. The gas pressure in the gap of the radial bearing is increased by the region 123 having no grooves therein. A high gas pressure here contributes to an increase in the support force in the radial direction because a large dynamic pressure is generated by a deviation or a tilt in the shaft or sleeve.

Figure 5:
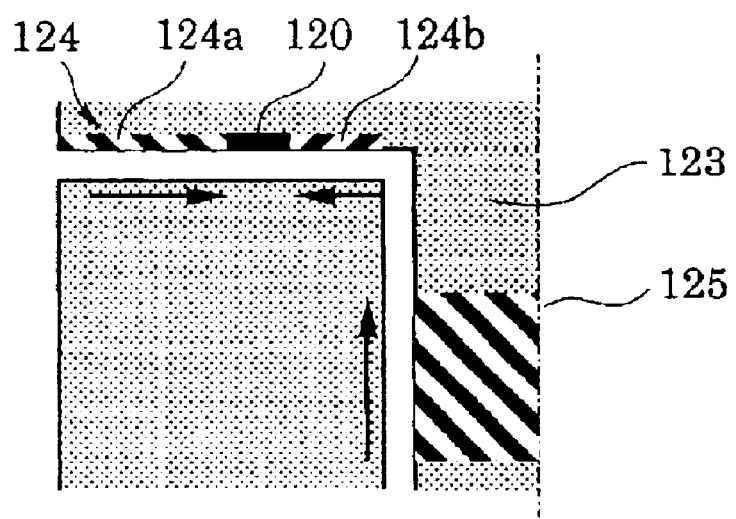
FIG. 5 is a cross-sectional view of a fifth embodiment of the gas dynamic pressure bearing according to the present invention.

In FIG. 5, the dynamic pressure generating grooves in the radial bearing are spiral grooves 125 which increase the gas pressure toward the thrust bearing. The radial bearing also includes a region 123 which has no pressure generating grooves therein that is disposed on an end portion of the shaft. Like in FIG. 4, the region 123 increases the gas pressure in the gap of the radial bearing, and contributes to an increase in the support force in the radial direction. However, unlike in FIG. 4, the region 123 is disposed on an end portion of the shaft. Because of this, the structure of this bearing shows a particularly high rigidity with respect to moments that attempts to tilt the shaft or the sleeve.

In addition, in FIG. 5, the dynamic pressure generating grooves of the thrust bearing 124 have been split into groove portions 124a and 124b, and a region 120 having shallow grooves is disposed therebetween. Furthermore, this thrust bearing configuration pushes gas in opposing directions. The dynamic pressure generating grooves 124a on the outside push at a higher pressure than the dynamic pressure generating grooves 124b on the inside, and thus has a gas pushing force that exceeds that of the dynamic pressure generating grooves 124b. With this configuration, the pushing pressure is moderately weakened, and the pushing pressure from the radial bearing is adjusted so that it exceeds this. As a result, gas constantly flows to the thrust bearing, and thus a stable support force during startup is obtained.

Note that in the present invention, the optimal depth of the dynamic pressure generating grooves of the thrust dynamic pressure bearing differ according to the bearing structure employed. Even in the gas dynamic pressure bearings shown in FIGS. 2 to 5, the optimal depth of the dynamic pressure generating grooves is not fixed. This is because not only are the structures of the thrust bearings therein different, but the structures of the corresponding radial dynamic bearings are different as well, and thus the support force generated thereby is different. In this situation, the optimal groove depth is determined by the method noted below to obtain an gas dynamic pressure bearing having the ideal capabilities.

In a gas dynamic pressure bearing, it is known that the groove depth of the thrust bearing at which its load capacity is at a maximum should be three times the size of the gap in the bearing, all other factors being equal. This is because the groove depth must be shallow in order to move the surfaces of the thrust bearing to the non-contact state from a low speed. When this type of design is implemented in a conventional gas dynamic pressure bearing, the space between the bearing surfaces that is maintained during rated rotation is reduced, contact between the bearing surfaces increases, and the reliability of the bearing deteriorates.

In the method of the present invention, it is easy to maintain a gap between the thrust bearing surfaces because high pressure is produced in a region between the radial bearing and the thrust bearing in order to provide a support force in the thrust direction. Because of this, the method of the present invention excels at moving the bearing surfaces to the non-contact state at low speeds, and the depth of the dynamic pressure generating grooves can be selected. However, it is difficult to determine the optimal depth of the dynamic pressure generating grooves in advance because this largely depends upon the rated rotation speed and the load capacity of the bearing. Thus, there is no choice but to conduct some experimentation in order to determine the final groove depth.

However, in the present invention, this experimentation is largely limited to the determination of the groove depth of the thrust bearings, and thus by acquiring a plurality of gas dynamic bearings in which only their groove depth has been changed, the optimal groove depth is efficiently determined. A bearing obtained in this manner has bearing surfaces that move promptly to the non-contact state during startup, the torque needed during startup is reduced, and is stable at its rated rotation.

3. Sixth Embodiment

Figure 6A:
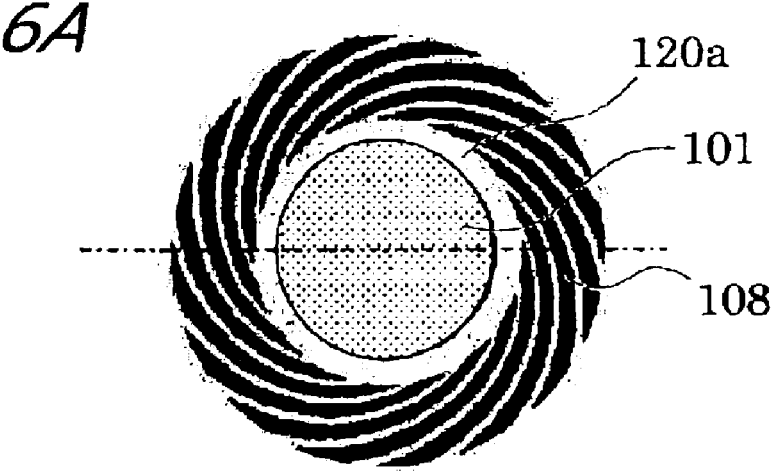
FIG. 6 is a plane and a cross-sectional view of a sixth embodiment of the gas dynamic pressure bearing according to the present invention.
Figure 6B:
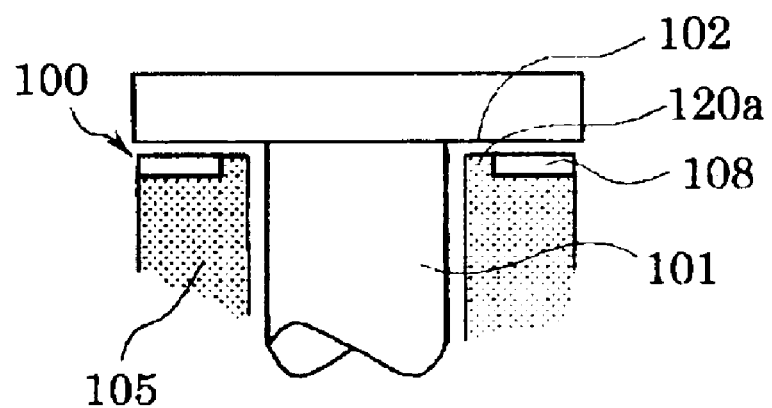

FIG. 6 shows a gas dynamic pressure bearing in which the region 120 in FIG. 2 which has shallow grooves is replaced with a flat portion 120a in which there are no grooves formed therein. FIG. 6(a) shows a plan view of this bearing, and FIG. 6(b) shows a cross-sectional view thereof. In this example, the dynamic pressure generating grooves 108 are not formed in the thrust bearing surface 102 of the shaft, but rather in an end surface of the-sleeve 105. Note that in FIG. 6, the dynamic pressure generating grooves formed in the radial bearing surface are not shown.

This configuration interrupts the gas flow more completely, and thus the support pressure of the thrust bearing during startup increases. Moreover, unlike the structure in FIG. 2, manufacturing this configuration is easier because it is not necessary to separately produce shallow dynamic pressure generating grooves and deep dynamic pressure generating grooves.

Note that FIGS. 2 to 6 are structures in which the groove depth in the end portions thereof was changed. However, it is obvious to one of ordinary skill in the art that the same effects are obtained by reducing the width of the grooves, even if the cross-section area that is capable of propagating a gas flow is reduced.

As previously noted, the gas dynamic pressure bearing according to the present invention promptly moves the bearing surfaces to a non-contact position, and has a high degree of rigidity with respect to moments that attempt to tilt the shaft or the sleeve. However, the reasons why this high degree of rigidity is achieved is explained in greater detail in FIGS. 7 to 10.

Figure 7:
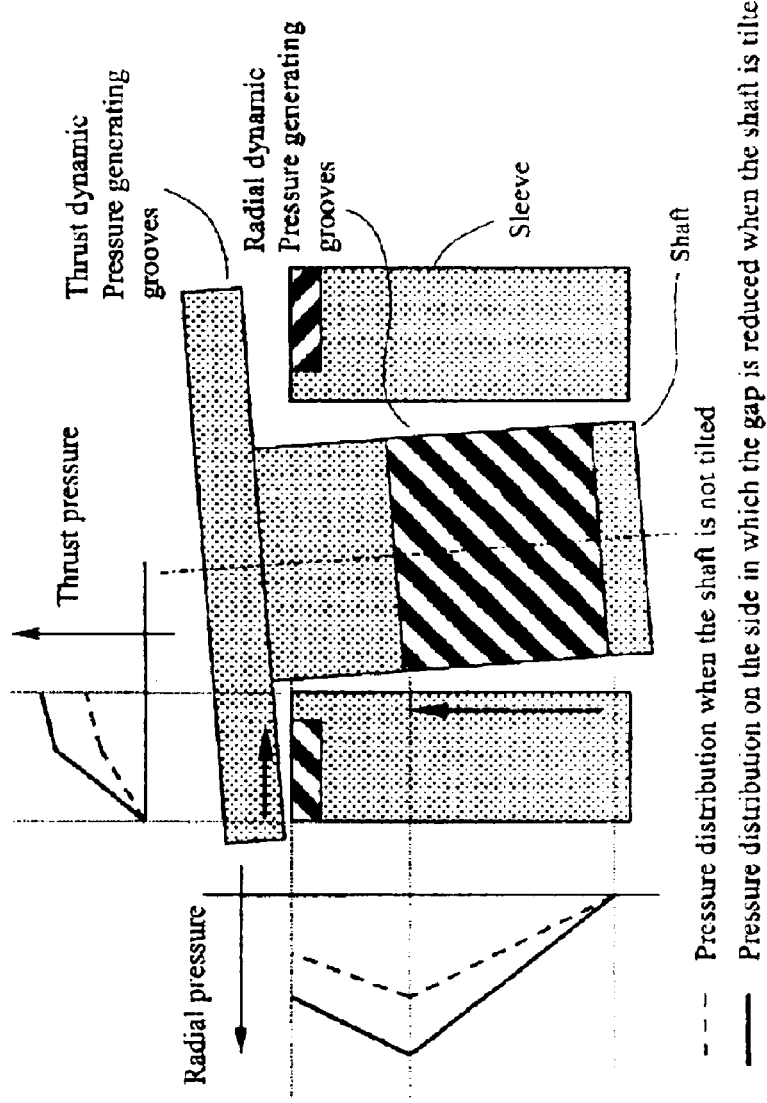
FIG. 7 describes the mechanism by which the gas dynamic pressure bearing of the present invention produces additional rigidity.

FIG. 7 shows the gas dynamic pressure bearing shown in FIG. 6, and the change in pressure produced in the bearings when the shaft is tilted. The bearings of the present invention have a high degree of rigidity because a region in which the gas pressure is high is formed at one end of the radial bearing. Nevertheless, a tilt will be produced with respect to the shaft if a moment is applied thereto. If the tilt produced in the shaft, the pressure increases on the tilted side and this becomes a righting moment. However, in the bearing of the present invention, the entire region between the radial bearing and thrust bearing has a high pressure, and the righting moment that is produced thereby is even higher.

Figure 8:
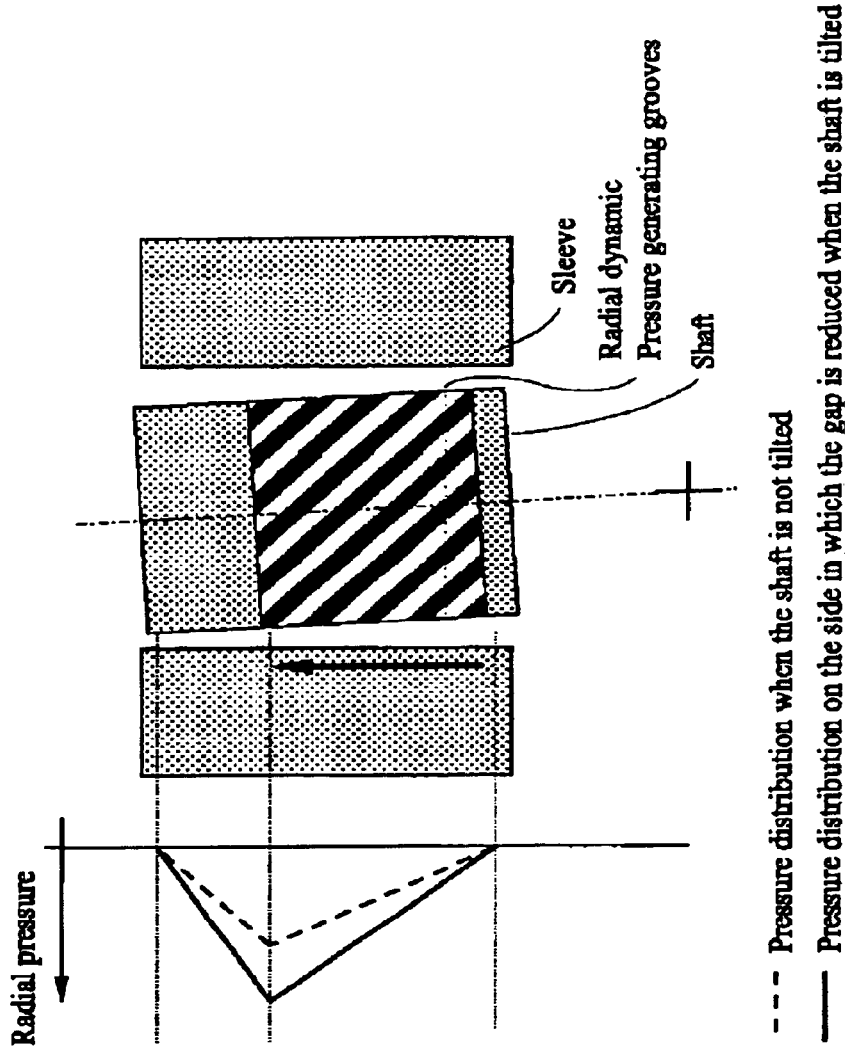
FIG. 8 describes the rigidity of a first conventional gas dynamic pressure bearing.
Figure 9:
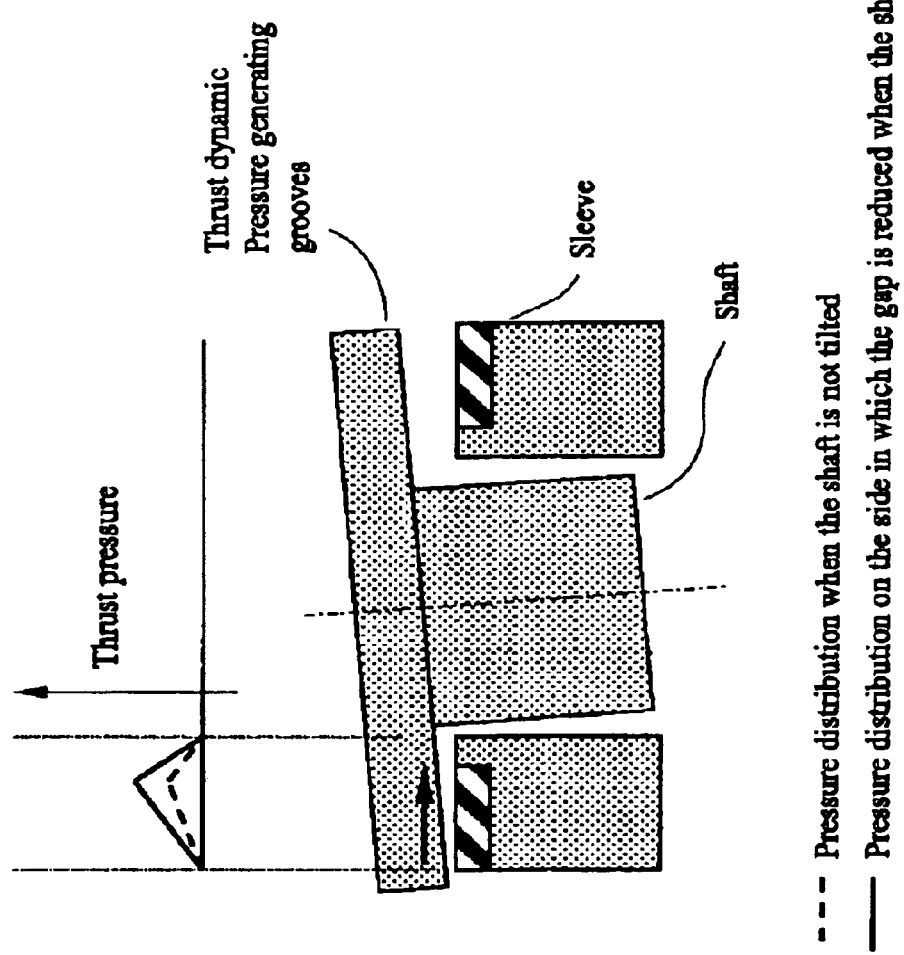
FIG. 9 describes the rigidity of a second conventional gas dynamic pressure bearing having bearing.

With the conventional gas dynamic pressure bearings shown in FIGS. 8 and 9, even though the pressure on the tilted side is increased, the righting moment that is produced thereby is much smaller than that produced by the gas dynamic pressure bearing of the present invention. FIG. 8 shows a structure in which only the radial bearing shown in FIG. 7 is used, and FIG. 9 shows a structure in which only the thrust bearing shown in FIG. 7 is used. These figures clearly show the effect that each bearing has when used separately. With the structures shown in FIG. 8 and FIG. 9, even though pressure increases on the tilted side as the shaft is being tilted, the increased pressure drops at some point along the bearing, and drops down to the ambient pressure at the end of the shaft (FIG. 8) or the inner circumferential portion of the bearing (FIG. 9) because the end portion or the inner circumferential portion is connected to an ambient pressure region.

FIGS. 8 and 9 show bearings that have a region in the end portion of the shaft in which no grooves are formed therein. However, even if the region having dynamic pressure grooves therein is widened up to the end portion or the inner circumference in order to increase the pressure that is generated there, a large increase in pressure cannot be expected. This is because the pressure escapes via the grooves due to the fact that this area is connected to an ambient pressure region. Note that in the aforementioned description, the examples provided were those in which the shaft is the bearing structure that rotates. However, even if the sleeve is structure that rotates, the same effects are obtained.

Figure 10:
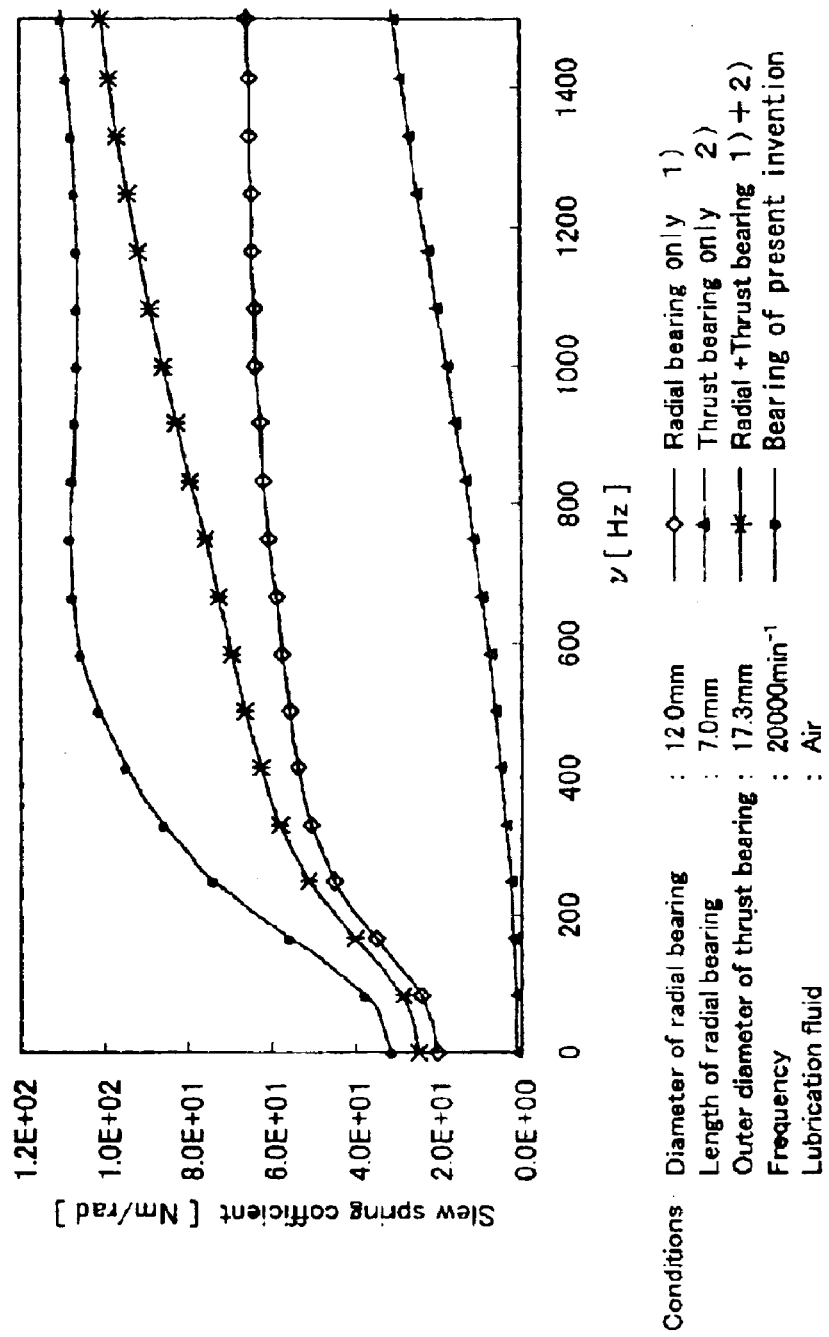
FIG. 10 is a graph which compares the rigidity of conventional gas dynamic pressure bearings to that of the gas dynamic pressure bearing according to the present invention.

FIG. 10 is a graph showing the rigidity of the shaft (vertical axis) versus the rotational frequency of the shaft (horizontal axis) when the shaft is continuously shaken at an extremely small amplitude in a direction which would tilt the shaft. In the figure, the terms radial bearing only or thrust bearing only respectively refer to the structures shown in FIG. 8 and FIG. 9, and the term bearing structure of the present invention refers to the bearing shown in FIG. 7. In addition, the term radial and thrust bearings refers to the result achieved by adding the rigidity shown by the radial bearing only structure and the rigidity of the thrust bearing only structure.

The gas dynamic pressure bearing of the present invention exhibits a rigidity that is higher than the rigidity achieved by adding the rigidity exhibited by the radial bearing only structure and the rigidity of the thrust bearing only structure. This is clearly shown in FIG. 10. As noted in the previous description of FIG. 7, this is because the radial bearing and the thrust bearing cooperate with each other to display a synergistic effect.

As clearly shown by the pressure distribution of FIGS. 7 and 10, the gas dynamic pressure bearing according to the present invention is structured such that when at rated rotation, the pump-out pressure from the radial bearing exceeds the pump-in pressure from the thrust bearing, and thus the gas flows as a whole from the radial bearing to the thrust bearing, and is discharged from the end portion of the thrust bearing.

Note that FIG. 10 does not show the effect of a structure having a radial bearing and a thrust bearing, and which opens to the outside atmosphere at a connecting portion like that shown, for example, in Japanese Published Patent Application 2000-304037. However, it is obvious to one of ordinary skill in the art that with a structure in which the gas pressure of an end portion of the radial bearing drops, such as that shown in Japanese Published Patent Application 2000-304037, the rigidity thereof with respect to moments that attempt to tilt the shaft is less than that of the present invention.

As described above, the bearing structure of the present invention not only connects the end portion of the radial bearing with the end portion of the thrust bearing, but the total support force generated by the radial bearing and the thrust bearing is greater than the sum of the individual support forces produced thereby, and thus display a high degree of rigidity, because the dynamic pressure generating grooves of each bearing push gas toward the region between the thrust and radial bearings.

4. Seventh Embodiment

Figure 11:
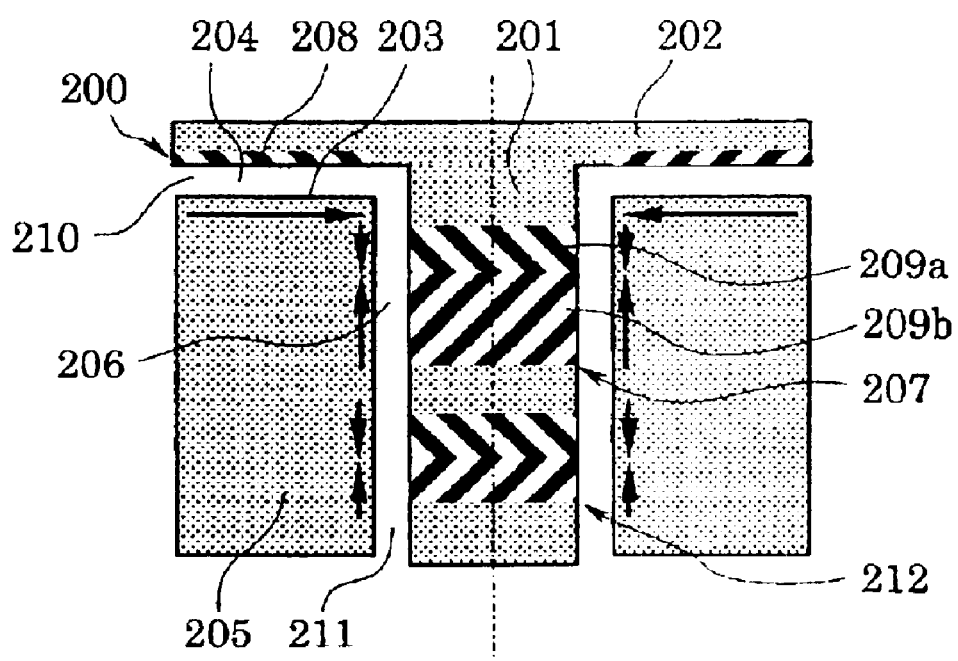
FIG. 11 is a cross-sectional view of a seventh embodiment of the gas dynamic pressure bearing according to the present invention.

FIG. 11 shows a bearing structure having a thrust plate 202 on an end portion of the shaft, and the shaft interposed in a cylindrical sleeve 205. A region with shallow grooves is not included in the dynamic pressure generating grooves 208 in the thrust bearing 200. However, a region similar to those shown in the second and third embodiments may be provided. By doing this, the bearing surfaces move to the non-contact state more promptly.

In addition, in this example, a second radial bearing 212 is provided. In the figure, the force with which the gas is pushed is indicated by the length of the arrows therein. However, as is clear from these lengths, the dynamic pressure grooves of the radial bearing 212 have a symmetrical herringbone shape with respect to the axial direction, and is not a structure that produces pressure differences.

An end portion 210 of a gap 204 that forms a part of the thrust bearing 200 is disposed at a point in which the pressure is reduced by the dynamic pressure generating grooves 208. An end portion 211 of a gap 206 that forms a part of the radial bearings 207, 212 is disposed at a point in which the pressure is reduced by the dynamic pressure generating grooves 209a, 209b. The end portions 210, 211 of these gaps are connected via a separate pathway.

This separate pathway is not shown in the figures, but, for example, can be a long hole through the sleeve that connects the two end portions 210, 211. In the alternative, the separate pathway may be formed more simply by opening the end portions 210, 211 to the surrounding space. Gas from the openings flow out, and the surrounding space functions as a connecting pathway. However, the surrounding space of the end portion 210 and the surrounding space of the end portion 211 must be connected. When they are divided by a partition or the like, the flow of gas in and out is restricted, and the bearings will cease functioning correctly, if each one cannot hold a sufficient amount of gas. Furthermore, the end portions 210, 211 may be connected to a gas reservoir. If connected to a gas reservoir, pressure changes in the bearings, and changes in their capabilities due to temperature and pressure change, are suppressed because a change in the gas volume is absorbed.

In the present invention, this type of connecting pathway must be provided in order to correct any discrepancies in pressure, because dynamic pressure generating grooves are used to actively take gas into the bearings and discharge gas therefrom.

In this embodiment, the thrust bearing surfaces promptly move to the non-contact state and the torque during startup is reduced. Moreover, the structure shows a high degree of rigidity with respect to moments that attempt to tilt the shaft or the sleeve.

5. Eighth Embodiment

An eighth embodiment relating to the present invention will be described with reference to FIG. 12.

Figure 12:
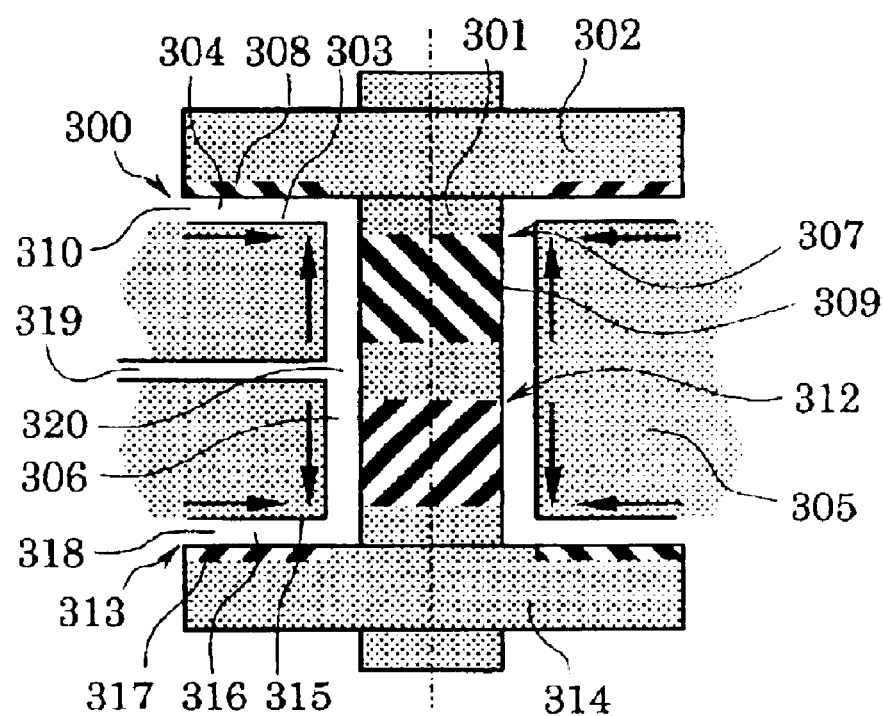
FIG. 12 is a cross-sectional view of an eighth embodiment of the gas dynamic pressure bearing according to the present invention.

FIG. 12 is a structure comprised of two thrust plates 302, 314 on both end portions of a shaft 301. In addition, the structure is also comprised of a pair of radial bearings, and is vertically symmetrical. The radial bearing 307 is a structure that pushes gas toward the thrust plate 302, and the radial bearing 312 is a structure that pushes gas toward the thrust plate 314. In addition, in order for the structure to show a high degree of rigidity with respect to moments that attempt to tilt the shaft or the sleeve, the support points of the radial bearings are as close as possible to both ends of the shaft, both radial bearings 307, 312 are spiral shaped, and both ends of the radial bearing surfaces have high pressures generated therein. In this figure, the dynamic pressure generating grooves 308, 317 of the thrust bearings do not have regions in which the grooves are shallow, however regions with shallow grooves may be provided. In this situation, the support force generated in the thrust bearing at startup is particularly high.

If the gas in a region 320 between the two radial bearings 307, 312 is discharged but not replenished, there is a possibility that the gas pressure will drop therein and the bearings will not function properly. Thus, a communication pathway 319 is provided in the sleeve 305 in order for gas to be introduced therein. The same amount of gas that is discharged from end portions 310 and 318 on the gas discharge side of the dynamic pressure generating grooves 308 must return to the center of the bearings via at least the communication path 319. Thus, the communication path 319, at minimum, must be connected to the end portions 310 and 318 via a pathway other than the bearing gaps 306, 304, and 316. In order to absorb pressure changes due to temperature changes and the like, an gas reservoir may be provided along this path. Or, more simply, if 319, 310, and 318 are opened to the surrounding atmosphere, the gas balance therein is maintained.

With this structure, startup torque is be reduced, low cost bearings whose thrust bearing surfaces are difficult to bring into contact with each other at rated rotation are achieved, and a gas dynamic pressure bearing is obtained which exhibits a high degree of rigidity with respect to moments that attempt to tilt the shaft or the sleeve.

6. Ninth Embodiment

A ninth embodiment relating to the present invention will be described with reference to FIG. 13.

Figure 13:
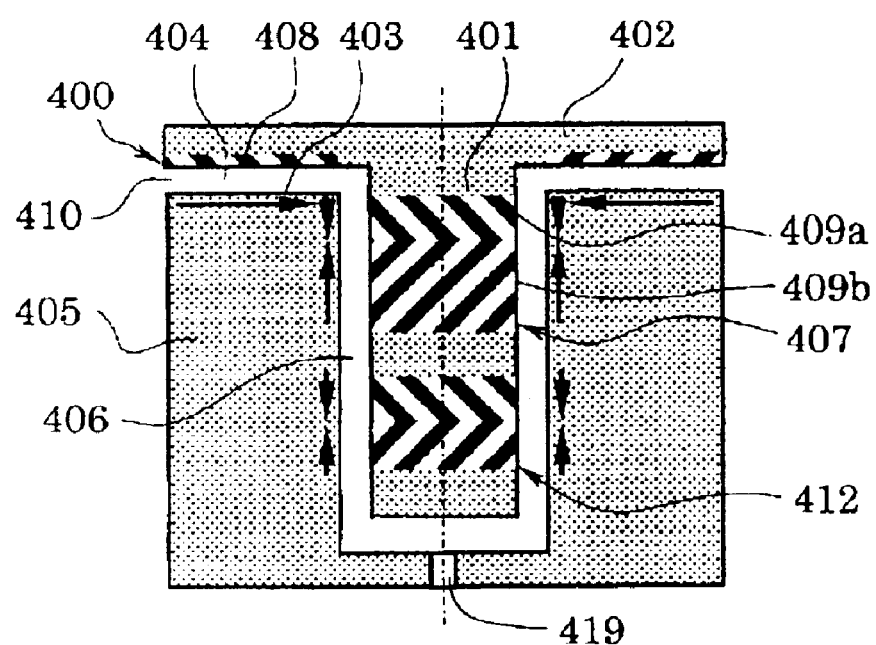
FIG. 13 is a cross-sectional view of a ninth embodiment of the gas dynamic pressure bearing according to the present invention.

FIG. 13 shows a bearing structure comprising a cylindrical sleeve having a floor formed in the bottom thereof, and a shaft comprising a thrust plate on one end thereof. The present invention is applicable even with respect to a bearing having this structure. A radial bearing 412 on the lower portion of the shaft is a structure that does not push gas in either direction.

In this figure, a communication pathway 419 is provided in the floor in the cylindrical sleeve, and in fact supplies gas anywhere it is disposed if in the low pressure side of the radial bearing 407 that pushes gas to the thrust bearing. This communication pathway 419 must be connected to an end portion 410 on the low pressure side of the thrust bearing gap via a path other than the gaps 404, 406 that are formed in the bearing.

The structure shown in FIG. 13 reduces the risk of the bearing surfaces of the thrust bearing coming into contact with each other, and exhibits a high degree of rigidity with respect to moments that attempt to tilt the shaft or the sleeve, even if the gas dynamic pressure bearing is comprised of a cylindrical sleeve having a bottom floor, and a shaft comprising a thrust plate on one end thereof.

7. Tenth Embodiment

A tenth embodiment relating to the present invention will be described with reference to FIG. 14.

Figure 14:
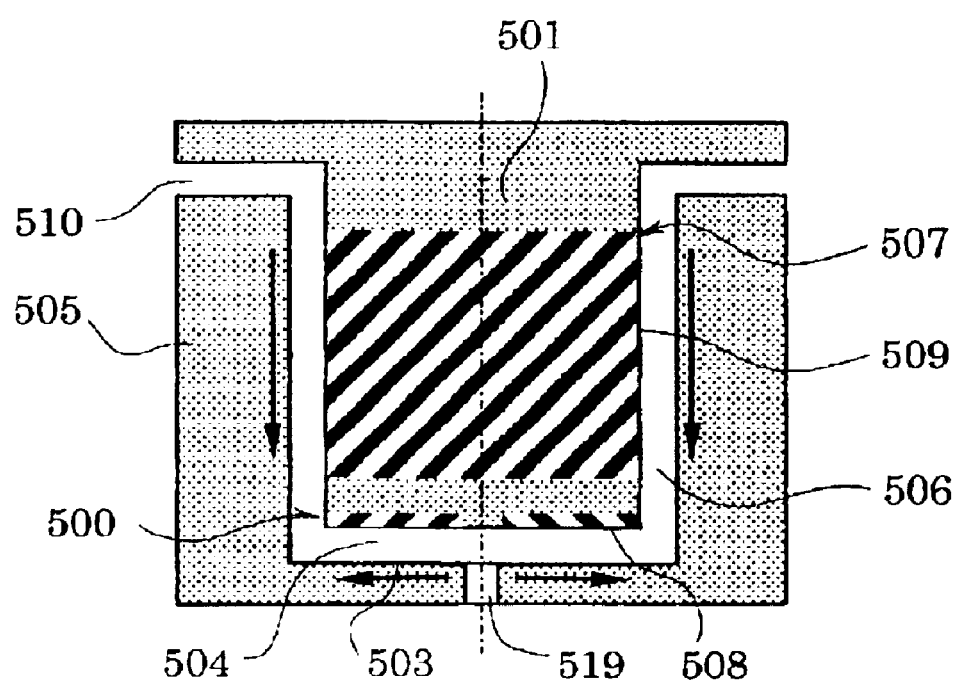
FIG. 14 is a cross-sectional view of a tenth embodiment of the gas dynamic pressure bearing according to the present invention.

FIG. 14 shows a bearing structure comprising a cylindrical sleeve having a floor formed in the bottom thereof, and a shaft comprising a thrust plate on one end thereof. A thrust bearing 500 is provided on the bottom floor of the shaft 501, and when dynamic pressure generating grooves 508 generate a thrust support force, they push gas in the circumferential direction simultaneously therewith. The dynamic pressure generating grooves 509 of the radial bearing 507 push gas downward to the regions in which the gap 504 of the thrust bearing and the gap 506 of the radial bearing intersect. The gas converges therein and generates a high pressure, and thereby assists in the movement of the thrust surfaces of the thrust bearing to the non-contact state.

A communication pathway 519 must be connected to an end portion 510 on the low pressure side of the thrust bearing gap via a path other than the gaps 504, 506 that are formed in the bearing.

The structure shown in FIG. 14 makes it easy to maintain a gap between the thrust bearing surfaces, and exhibits a high degree of rigidity with respect to moments that attempt to tilt the shaft or the sleeve, even if the gas dynamic pressure bearing is comprised of a cylindrical sleeve having a bottom floor, and a shaft comprising a thrust plate on one end thereof.

8. Eleventh Embodiment

An eleventh embodiment relating to the present invention will be described with reference to FIG. 15.

Figure 15:
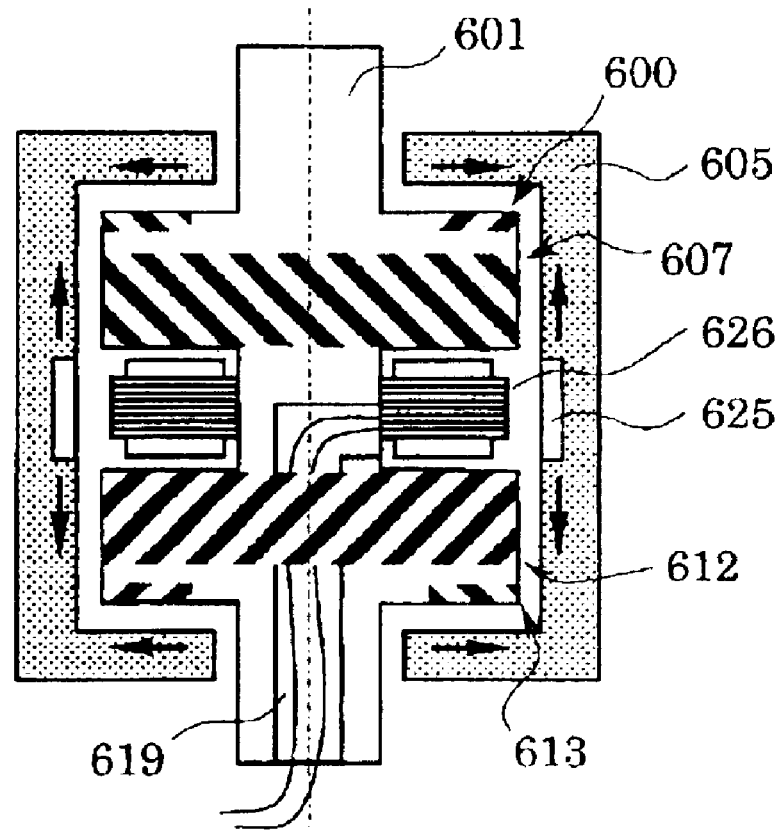
FIG. 15 is a cross-sectional view of an eleventh embodiment, in which a spindle motor according to the present invention has a gas dynamic pressure bearing according to the present invention disposed therein.

FIG. 15 is an example of a spindle motor that uses the gas dynamic pressure bearing of the present invention. The structure of the bearings therein is similar to that described in the sixth embodiment above, except that there are two vertically stacked bearings that are symmetrical about a horizontal plane. However, here a shaft 601 extends through the sleeve in a vertical direction, and an gas communication pathway 619 is provided through the middle of the shaft.

In this motor, the radial bearing surfaces are divided vertically in order to accommodate a stator 626 that serves to drive the motor. A rotor magnet 625 is installed in an inner surface of a sleeve 605, the force from the rotor magnet 625 influences the stator 626, and a rotational drive force is generated thereby. The arrows in the figure indicate the direction in which gas is pushed, however as is clearly seen, gas from the exterior of the motor comes into the structure via the communication pathway 619 because the pressure near the center of the interior of the bearing is reduced. In addition, a power line to the stator is disposed in the communication pathway 619.

Thus, by using the bearings of the present invention, a low amount of electrical power is used at startup, costs are lowered, and a spindle motor having a high degree of reliability is provided.

9. Twelfth to Fourteenth Embodiments

Twelfth to fourteenth embodiments relating to the present invention will be described with reference to FIGS. 16 to 18.

Figure 16:
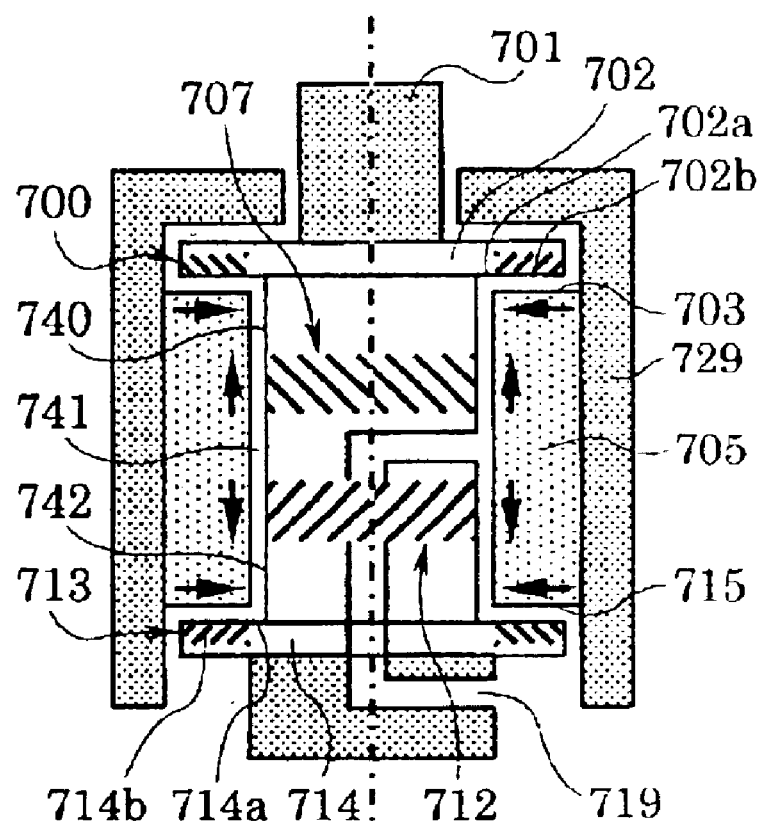
FIG. 16 is a cross-sectional view of a embodiment of the gas dynamic pressure bearing according to the present invention.

A shaft 701 in the gas dynamic pressure bearing in FIG. 16 has two thrust plates 702, 714 installed thereon, and the surfaces 702a, 714a that face each other are shaft thrust bearing surfaces. Both end surfaces of a sleeve 705 are thrust bearing surfaces 703, 715, and the thrust bearing surfaces 702a, 714a on the shaft respectively face these surfaces, defining thrust dynamic pressure bearings 700, 713 respectively. In this example, dynamic pressure generating grooves are formed on the thrust bearing surfaces 702a, 714a of the shaft, but may instead be formed on the thrust bearing surfaces 703, 715 on the sleeve.

As shown by the arrows in the figure, the thrust dynamic pressure bearings 700, 713 are constructed so that they increase the gas pressure toward the radial bearing surfaces. In this figure, there is no region having shallow grooves therein provided in the dynamic pressure generating grooves 702b, 714b, but such a region may be provided. In this situation, the support force produced by the thrust bearing during startup is particularly high.

Two radial dynamic pressure bearings 707, 712 are formed in the circumferential surface of the shaft 701 between the two thrust plates. These radial bearings are somewhat close to each other in the central portion in the axial direction of the shaft, and flat surfaces 740, 742 that do not have any dynamic pressure grooves formed therein extend between the thrust plates. As shown by the arrows in the figure, the pressure of the gas is increased due to the effects of the dynamic pressure bearings 707, 712. As a result, there is a large amount of dynamic pressure generated when an eccentricity or tilt is produced in the shaft, and this contributes to an increase in the rigidity of the bearing.

Gas is discharged from a region 741 interposed between the two radial dynamic pressure bearings by means of the discharge effect of the dynamic pressure bearings. Because any gas lost from this portion will harm the operation of the bearing, a communication pathway 719 that opens to the region 741 and replenishes this gas is provided. The communication pathway 719 only passes near the thrust dynamic pressure bearing 713, but it compensates for any disparities in the flow of gas in the entire bearing because the gas surrounding the bearings is connected to the outer side of the thrust dynamic pressure bearing 700.

Figure 17:
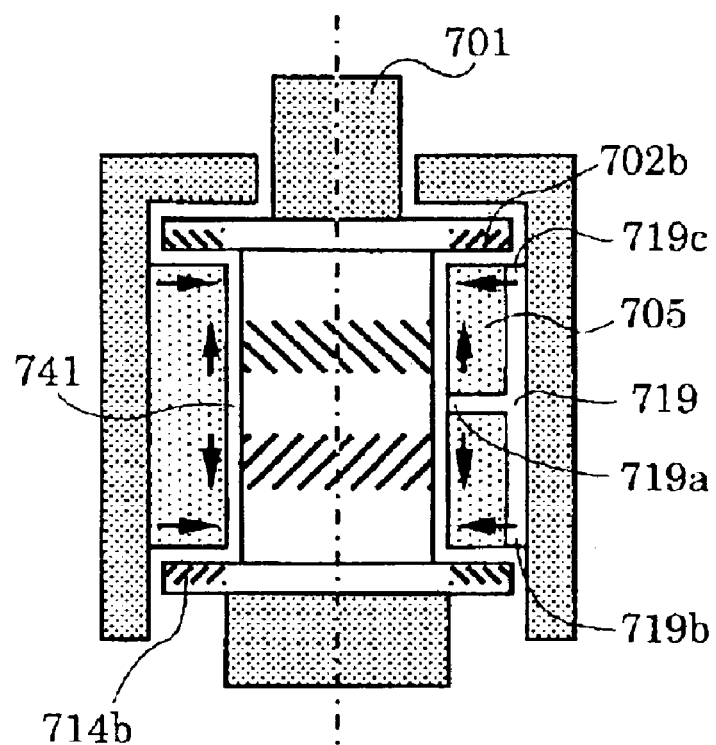
FIG. 17 is a cross-sectional view of a twelfth embodiment of the gas dynamic pressure bearing according to the present invention.

In FIG. 16, the communication pathway 719 is formed in the shaft 701, but as shown in FIG. 17, it may be formed in the sleeve 705. In FIG. 17, the communication pathway 719 opens at 719a to a region 741 interposed between the two radial bearings, and the communication pathway 719 opens at 719b, 719c to the edge portions of the pressure reduced sides of the dynamic pressure generating grooves 702b, 714b of the thrust bearings, thereby allowing gas to freely flow therethrough. In addition, as shown in FIG. 18, the communication pathway 719 is formed as grooves in a hub 729. As will be described below, the sleeve is preferably formed from a ceramic material or the like, but processing ceramic material is expensive. On the other hand, the hub 729 may be formed from a normal aluminum type of metal or stainless steel, and is easier to process. Thus by producing the structure shown in FIG. 18, the communication path is easily formed, and the cost of producing the gas dynamic pressure bearing is reduced. Note that with FIGS. 17 and 18, in order to form a communication pathway in the rotational body, it is necessary to form the communication pathway such that it is symmetrical with respect to the rotational body.

Figure 18:
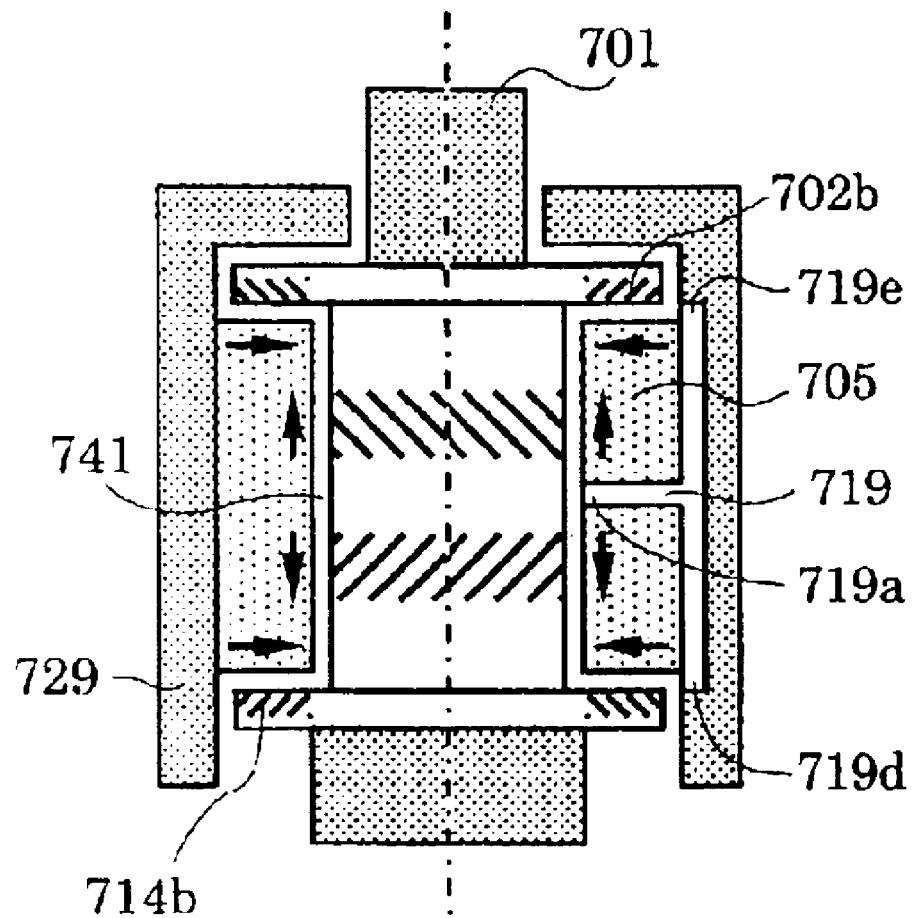
FIG. 18 is a cross-sectional view of a thirteenth embodiment of a gas dynamic pressure bearing according to the present invention.

In the structure shown in FIGS. 16, 17, and 18, torque at startup is reduced, the bearing surfaces of the thrust bearing promptly moves to the non-contact state, and a bearing with a high degree of rigidity is produced at a low cost.

11. Fifteenth Embodiment

A fifteenth embodiment relating to the present invention will be described with reference to FIG. 19.

Figure 19:
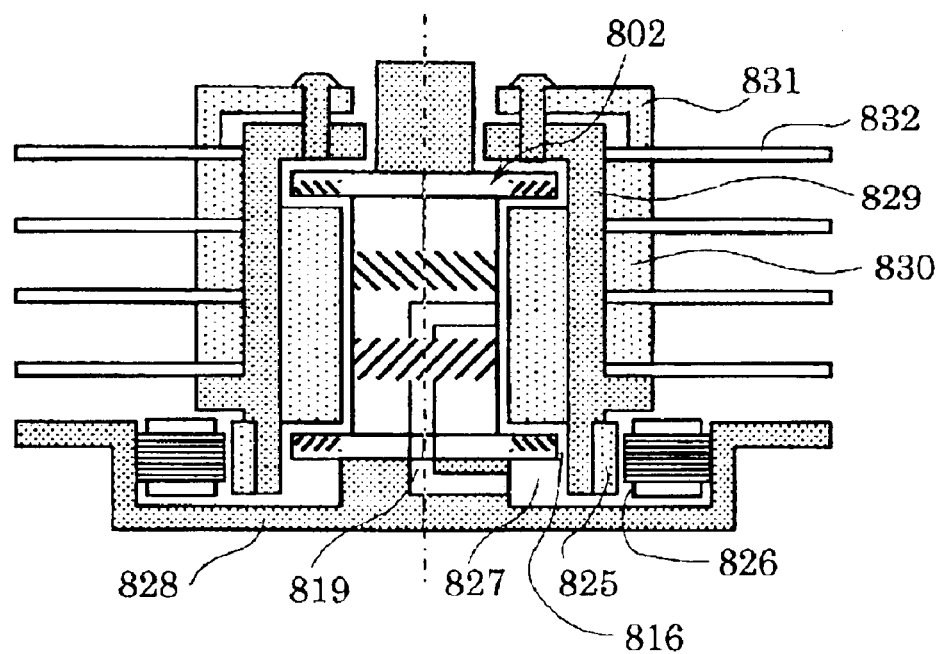
FIG. 19 is a cross-sectional view of a second embodiment of a spindle motor according to the present invention in which the gas dynamic pressure bearing according to the present invention is employed.

FIG. 19 is an example of a spindle motor which uses the bearing of the present invention described in the twelfth embodiment above. A gas dynamic pressure bearing 802 is formed on a base 828, and disks 832 are installed on a hub 829 that is fitted around the outside of the bearing. A spacer 830 and a clamp 831 are used, and in this figure, 4 disks are installed on the hub 829.

A stator 826 is installed on the base 828, and a rotor magnet 825 that is installed on the lower portion of the hub 829 acts upon the stator 826 to generate rotational driving force. In order to lower the pressure in the central portion of the bearing 802, an annular space 827 is linked thereto via a communication pathway 819. In addition, the annular space 827 links to a gap 816 in the thrust bearing, and gas flows through an annular pathway comprising 819, 827, and 816.

This configuration limits the flow of gas inside the bearing, and suppresses the flow of gas toward the disk chamber. In FIG. 16, an annular space is provided in the upper side of the thrust bearing, and that same structure is provided here according to need.

Because it does not use a liquid lubricating agent, this gas dynamic pressure bearing has a high degree of cleanliness. In addition, the possibility that the disks will become contaminated thereby is reduced.

12. Sixteenth Embodiment

Figure 20:
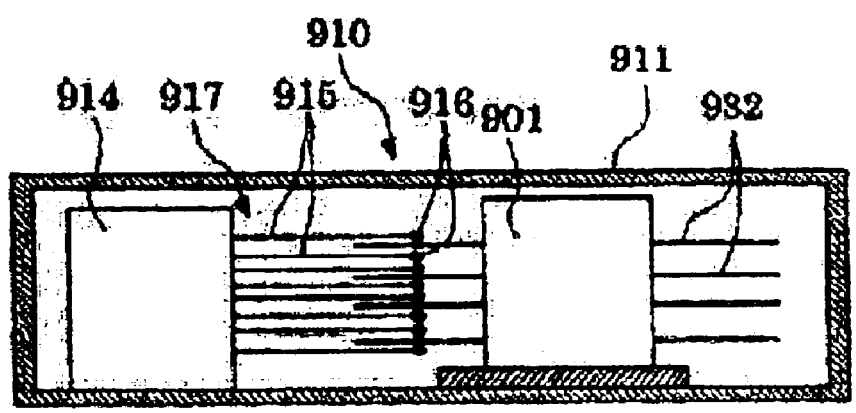
FIG. 20 is a cross-sectional view of a hard disk drive that employs the gas dynamic pressure bearing according to the present invention.

A sixteenth embodiment relating to the present invention will be described with reference to FIG. 20. FIG. 20 shows the internal structure of a hard disk device 910 that comprises a spindle motor 901 that is identical to that described in FIG. 18.

A clean space virtually free of dust and other contaminants is formed inside a housing 911, and a spindle motor 901 on which are mounted disk-shaped recording disks 932 that record data is disposed inside the housing 911. In addition, a magnetic head movement mechanism 917 that reads data from and writes data to the recording disks 932 is disposed inside the housing 911. The magnetic head movement mechanism 917 is comprised of heads 916 that read data from and write data to the recording disk, arms 915 that support the heads 916, and an actuator 914 that moves the heads and the arms to required positions on the disks.

In this type of hard disk device 910, the recording disks 932 is rotatively driven in a predetermined direction by rotating the spindle motor 901. The actuator 914 slews the arms 915, and the heads 916 mounted thereon move in an approximately radial direction on the recording disks 932 that face the heads 916. As a result, data that is to be recorded onto the recording disks 932 is magnetically written thereon by means of the heads 916, or data recorded on the recording disks 932 is read out therefrom by the heads 916.

The hard disk 910 starts up promptly, the amount of electric power used thereby at startup is small, achieves high speed rotation, and has a high degree of reliability, because of the gas dynamic bearing according to the present invention.

13. Seventeenth Embodiment

Figure 21:
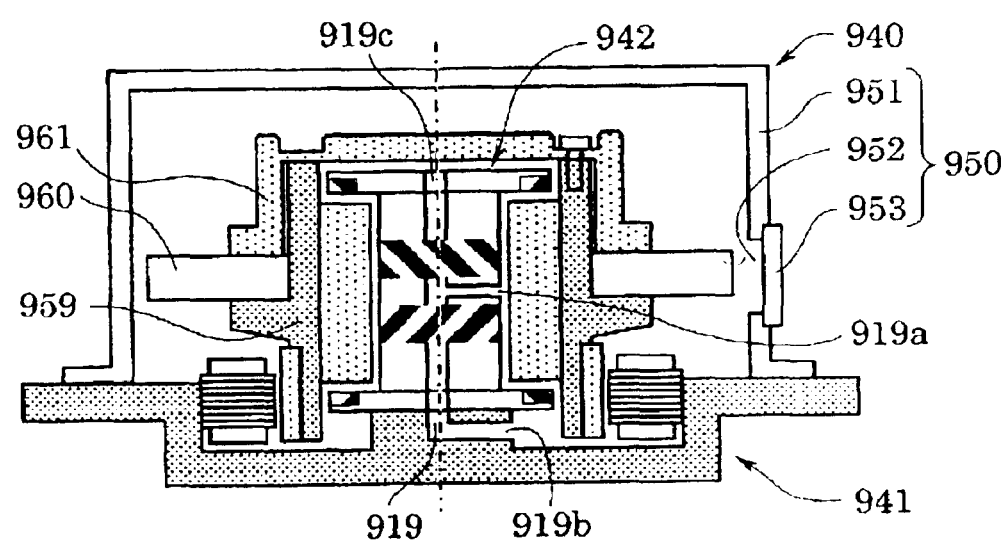
FIG. 21 is a cross-sectional view of a polygon scanner that employs a gas dynamic pressure bearing according to the present invention.

FIG. 21 is a longitudinal cross section that shows the basic structure of a polygon scanner 940 according to the present invention. The polygon scanner 940 is comprised of a housing (not shown in the figures), a spindle motor 941 that is fixed to the housing, a mirror 960, a mirror holder 961, and a cover unit 950. The polygon scanner 940 is, for example, employed as a laser writing device in a digital copying machine. The mirror 960 is rotated at a high speed by the spindle motor 941, and a laser beam from a laser diode is swept in the direction of rotation.

The mirror 960 is mounted on top of a brim of a hub 959, and is fixed to the hub 959 by the mirror holder 961. The mirror 960 is a plate shaped member in which the side surface thereof has a polygon mirror thereon.

The cover unit 950 is comprised of a cover 951, a light transmittance slit 952, and a glass cover 953. The cover 951 is fixed so as to seal the gas dynamic pressure bearing 942, in order to prevent dust from entering into the gas dynamic pressure bearing 942 of the spindle motor 941. The light transmittance slit 952 is a slit provided in the side surface of the cover 951 and is covered by the glass cover 953. The laser beam is transmitted therethrough while maintaining the sealed state.

The spindle motor 941 has a structure that is similar to the spindle motor described in the eleventh embodiment above, but a portion of the communication pathway 919 is different. The communication pathway 919 opens between two radial dynamic pressure bearings (919a), and opens on the outer side of each thrust plate (919b, 919c). With this structure, gas circulates inside the bearing, and thus very little contamination such as dust and the like produced inside the bearing travels outside the bearing or infiltrates into the bearing.

In addition, a filter or an absorbent material for absorbing dust may be provided in the interior of the connecting path. This increases the degree of cleanliness. Note that the spindle motor 941 having this type of communication pathway 919 is not only effective in a polygon scanner, but also can be adopted in a recording disk drive device.

This polygon scanner 940 is capable of rotating the polygon mirror 960 at a high speed and with a high degree of accuracy. As a result, it becomes possible to increase the print quality of a digital copying machine, a laser printer, or the like in which this polygon scanner 940 is mounted, and also becomes possible to meet the demands for higher speeds. Moreover, it also becomes possible to provide inexpensive polygon scanners.

Note that the materials used in the aforementioned embodiments to construct each component are not particularly limited, so long as the materials are able to achieve the structure required in the present invention. However, because the sliding portions on the thrust bearing surfaces and the like come into contact with each other when stationary, it is preferred that they be formed from ceramic materials which reduce friction and abrasion during startup, such as sintered $Al_2O_3$. The size and the weight of the rotating member must be compatible with the support force produced by the bearing, because it will be difficult to support by means of gas dynamic pressure if too heavy.

In addition, the embodiments of the present invention are not limited to the embodiments described above. For example, the dynamic pressure generating grooves are illustrated in the figures as being primarily on the outer circumferential surface of the shaft, or on the thrust bearing surface joined to the shaft. However, even if the grooves are formed on the sleeve, the effects of the present invention are still achieved. In addition, the figures show spiral type and herringbone type dynamic pressure generating grooves, but other types of dynamic pressure generating grooves can be provided.

This application claims priority to Japanese Patent Application Nos. 2002-066391 and 2003-033427. The entire disclosure of Japanese Patent Application No. 2002-066391 and 2003-033427 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A gas dynamic pressure bearing, comprising:
   a shaft;
   a hollow cylindrical sleeve in which the shaft is disposed such that it can freely rotate relative thereto;
   a first thrust dynamic pressure bearing, the thrust dynamic pressure bearing comprising a first thrust bearing surface on the shaft, a first thrust bearing surface on the sleeve which faces the first thrust bearing surface on the shaft across a gap in an axial direction, and dynamic pressure generating grooves formed in at least the first thrust bearing surface on the shaft or the first thrust bearing surface on the sleeve; and
   a radial dynamic pressure bearing comprising an inner circumferential surface of the sleeve, an outer circumferential surface of the shaft which faces the inner circumferential surface of the sleeve across a gap in a radial direction, dynamic pressure generating grooves formed in at least the inner circumferential surface of the sleeve or the outer circumferential surface of the shaft, and a flat region having no dynamic pressure generating grooves formed on an end portion of the radial dynamic pressure bearing near the thrust dynamic pressure bearing; wherein:
   when the shaft rotates relative to the sleeve, the dynamic pressure generating grooves of the thrust dynamic pressure bearing produce a pressure differential in gas disposed in the gap of the thrust dynamic pressure bearing so that the pressure of the gas increases in the radial direction, and the dynamic pressure generating grooves of the radial dynamic measure bearing produce a pressure differential in gas disposed in the gap of the radial dynamic pressure bearing so that the pressure of the gas increases in the axial direction;
   an end portion of the gap of the thrust dynamic measure bearing where the pressure of the gas therein is increased is connected to an end portion of the gap of the radial dynamic pressure bearing where the pressure of the gas therein is increased; and
   a portion of the gap of the thrust dynamic measure bearing where the pressure of the gas therein is reduced is in gaseous communication with a portion of the gap of the radial dynamic measure bearing where the pressure of the gas therein is reduced via a gaseous communication means.

2. The gas dynamic pressure bearing set forth in claim 1, further comprising a region disposed near the end portion of the dynamic pressure generating grooves of the thrust dynamic pressure bearing in which dynamic pressure generating grooves formed therein have a depth or width which are smaller than adjacent dynamic pressure generating grooves; and wherein an interval between the thrust bearing surfaces of the thrust dynamic pressure bearing is fixed along the entire length thereof.

3. The gas dynamic pressure bearing set forth in claim 2, wherein the radial dynamic pressure bearing further comprises two sets of dynamic pressure generating grooves that are separated in the axial direction;

the radial dynamic pressure bearing is disposed between two thrust dynamic pressure bearings, the two thrust dynamic pressure bearings comprising two thrust bearing surfaces disposed on the shaft and two thrust bearing surfaces on the sleeve which respectively face the two thrust bearing surfaces on the shaft; and a communicating pathway is disposed in the sleeve or the shaft, opens to the gap of the radial dynamic pressure bearing at a point between the two sets of dynamic pressure generating grooves, and allows gaseous communication between the opening and a portion of the gap of the thrust dynamic pressure bearing where the pressure of the gas therein is reduced.

4. The gas dynamic pressure bearing set forth in claim 3, wherein the two thrust bearing surfaces on the shaft are perpendicular to a central axis of the shaft and extend outward therefrom, and face each other in the axial direction.

5. The gas dynamic pressure bearing set forth in claim 1, further comprising a region disposed near the end portion of the dynamic pressure generating grooves of the thrust dynamic pressure bearing in which no dynamic pressure generating grooves are formed therein; and wherein an interval between the thrust bearing surfaces of the thrust dynamic pressure bearing is fixed along the entire length thereof.

6. The gas dynamic pressure bearing set forth in claim 5, wherein the radial dynamic pressure bearing further comprises two sets of dynamic pressure generating grooves that are separated in the axial direction;

the radial dynamic pressure bearing is disposed between two thrust dynamic pressure bearings, the two thrust dynamic pressure bearings comprising two thrust bearing surfaces disposed on the shaft and two thrust bearing surface on the sleeve which respectively face the two thrust bearing surfaces on the shaft; and a communicating pathway is disposed in the sleeve or the shaft, opens to the gap of the radial dynamic pressure bearing at a point between the two sets of dynamic pressure generating grooves, and allows gaseous communication between the opening and a portion of the gap of the thrust dynamic pressure bearing where the pressure of the gas therein is reduced.

7. The gas dynamic pressure bearing set forth in claim 6, wherein two thrust bearing surfaces on the shaft are perpendicular to a central axis of the shaft and extend outward therefrom, and face each other in the axial direction.

8. A spindle motor, comprising:

the gas dynamic pressure bearing set forth in claim 7;

a hub on which a recording disk can be mounted and supported so as to be freely rotatable by means of the gas dynamic pressure bearing;

a rotor magnet that rotates integrally with the hub; and a stator that faces the rotor magnet and rotatively drives the rotor magnet.

9. A polygon scanner, comprising:

a housing;

the spindle motor set forth in claim 8, the spindle motor fixed in the housing; and a polygon minor fixed to the hub.

10. A spindle motor, comprising:

the gas dynamic pressure bearing set forth in claim 6;

a hub on which a recording disk can be mounted and supported so as to be freely rotatable by means of the gas dynamic pressure bearing;

a rotor magnet that rotates integrally with the hub; and a stator that faces the rotor magnet and rotatively drives the rotor magnet.

11. A recording disk drive device, comprising:

a housing;

the spindle motor set forth in claim 10, the spindle motor fixed to the housing;

a recording disk that is fixed to the hub and can record data; and a data access means for reading data to and reading data from required positions on the recording disk.

12. The gas dynamic pressure bearing set forth in claim 1, wherein the radial dynamic pressure bearing further comprises two sets of dynamic pressure generating grooves that are separated in the axial direction;

the radial dynamic pressure bearing is disposed between two thrust dynamic pressure bearings, the two thrust dynamic pressure bearings comprising two thrust bearing surfaces disposed on the shaft and two thrust bearing surfaces on the sleeve which respectively face the two thrust bearing surfaces on the shaft; and a communicating pathway is disposed in the sleeve or the shaft, opens to the gap of the radial dynamic pressure bearing at a point between the two sets of dynamic pressure generating grooves, and allows gaseous communication between the opening and a portion of the gap of the thrust dynamic pressure bearing where the pressure of the gas therein is reduced.

13. The gas dynamic pressure bearing set forth in claim 12, wherein the two thrust bearing surfaces on the shaft are perpendicular to a central axis of the shaft and extend outward therefrom, and face each other in the axial direction.

14. The gas dynamic pressure bearing set forth in claim 1, wherein the thrust bearing surface on the shaft is formed on one end surface thereof;

the cylindrical portion of the sleeve is closed at one end thereof with a flat surface; and a communicating pathway is formed in the flat surface of the sleeve, and opens to a gap in the axial direction at a point therein in which a pressure of gas therein is reduced by the dynamic pressure generating grooves of the thrust dynamic pressure bearing.

15. A gas dynamic measure bearing, comprising:

a shaft;

a hollow cylindrical sleeve in which the shaft is disposed such that it can freely rotate relative thereto;

a first thrust dynamic pressure bearing, comprising a first thrust bearing surface on the shaft, a first thrust bearing surface on the sleeve which faces the first thrust bearing surface on the shaft across a gap in an axial direction, dynamic pressure generating grooves formed in at least the first thrust bearing surface on the shaft or the first thrust bearing surface on the sleeve, and a region disposed near the end portion of the dynamic pressure generating grooves in which dynamic pressure generating grooves have a depth or width which are smaller than adjacent portions of the dynamic pressure generating grooves; and at least one radial dynamic measure bearing, comprising an inner circumferential surface of the sleeve, an outer circumferential surface of the shaft which faces the inner circumferential surface of the sleeve across a gap in a radial direction, and dynamic pressure generating grooves formed in at least the inner circumferential surface of the sleeve or the outer circumferential surface of the shaft; wherein;

when the shaft rotates relative to the sleeve, the dynamic pressure generating grooves of the thrust dynamic pressure bearing produce a pressure differential in gas disposed in the gap of the thrust dynamic pressure bearing so that the pressure of the gas increases in the radial direction and the dynamic pressure generating grooves of the radial dynamic pressure bearing produce a pressure differential in gap disposed in the gap of the radial dynamic pressure bearing so that the pressure of the gas increases in the axial direction;

an end portion of the gap of the thrust dynamic pressure bearing where the pressure of the gas therein is increased is connected to an end portion of the gap of the radial dynamic pressure bearing where the pressure of the gas therein is increased;

a portion of the gap of the thrust dynamic pressure bearing where the pressure of the gas therein is reduced is in gaseous communication with a portion of the gap of the radial dynamic pressure bearing where the pressure of the gas therein is reduced via a gaseous communication means; and an interval between the first thrust bearing surfaces of the first thrust dynamic pressure bearing is fixed along the entire length thereof.

16. The gas dynamic pressure bearing set forth in claim 15, wherein the radial dynamic pressure bearing further comprises two sets of dynamic pressure generating grooves that are separated in the axial direction;

the radial dynamic pressure bearing is disposed between two thrust dynamic pressure bearings, the two thrust dynamic pressure bearings comprising two thrust bearing surfaces disposed on the shaft and two thrust bearing surfaces on the sleeve which respectively face the two thrust bearing surfaces on the shaft; and a communicating pathway is disposed in the sleeve or the shaft, opens to the gap of the radial dynamic pressure bearing at a point between the two sets of dynamic pressure generating grooves, and allows gaseous communication between the opening and a portion of the gap of the thrust dynamic pressure bearing where the pressure of the gas therein is reduced.

17. The gas dynamic pressure bearing set forth in claim 16, wherein the two thrust bearing surfaces on the shaft are perpendicular to a central axis of the shaft and extend outward therefrom, and face each other in the axial direction.

18. The gas dynamic pressure bearing set forth in claim 15, wherein the thrust bearing surface on the shaft is formed on one end surface thereof; the cylindrical portion of the sleeve is closed at one end thereof with a flat surface; and a communicating pathway is formed in the flat surface of the sleeve, and opens to a gap in the axial direction at a point therein in which a pressure of gas therein is reduced by the dynamic pressure generating grooves of the thrust dynamic pressure bearing.

19. A gas dynamic pressure bearing, comprising:

a shaft;

a hollow cylindrical sleeve in which the shaft is disposed such that it can freely rotate relative thereto;

a first thrust dynamic pressure bearing, comprising a first thrust bearing surface on the shaft, a first thrust bearing surface on the sleeve which faces the thrust bearing surface on the shaft across a gap in an axial direction, and dynamic pressure generating grooves formed in at least the first thrust bearing surface on the shaft or the first thrust bearing surface on the sleeve;

a second thrust dynamic pressure bearing, comprising a second thrust bearing surface on the shaft, a second thrust bearing surface on the sleeve which faces the second thrust bearing surface on the shaft across a gap in an axial direction, and dynamic pressure generating grooves formed in at least the second thrust bearing surface on the shaft or the second thrust bearing surface on the sleeve;

a radial dynamic pressure bearing comprising an inner circumferential surface of the sleeve, an outer circumferential surface of the shaft which faces the inner circumferential surface of the sleeve across a gap in a radial direction, and two sets of dynamic pressure generating grooves formed in at least the inner circumferential surface of the sleeve or the outer circumferential surface of the shaft, the two sets of dynamic pressure generating grooves formed separately to each other in the axial direction; and a communicating pathway disposed in the sleeve or the shaft, having an opening to the gap of the radial dynamic pressure bearing at point between the two sets of radial dynamic pressure generating grooves, and allowing gaseous communication between the opening and a portion of the gap of the thrust dynamic pressure bearing where the pressure of the gas therein is reduced; wherein:

when the shaft rotates relative to the sleeve, the dynamic pressure generating grooves of the thrust dynamic pressure bearing produce a pressure differential in gas disposed in the gap of the thrust dynamic pressure bearing so that the pressure of the gas increases in the radial direction, and the dynamic pressure generating grooves of the radial dynamic pressure bearing produce a pressure differential in gas disposed in the gap of the radial dynamic pressure bearing so that the pressure of the gas increases in the axial direction;

an end portion of the gap of the thrust dynamic pressure bearing where the pressure of the gas therein is increased is connected to an end portion of the gap of the radial dynamic pressure bearing where the pressure of the gas therein is increased;

a portion of the gap of the thrust dynamic pressure bearing where the pressure of the gas therein is reduced is in gaseous communication with a portion of the gap of the radial dynamic pressure bearing where the pressure of the gas therein is reduced via a gaseous communication means; and the radial dynamic pressure bearing as disposed between two thrust dynamic pressure bearings, the two thrust dynamic pressure bearings comprising two thrust bearing surfaces disposed on the shaft and two thrust bearing surfaces on the sleeve which respectively face the two thrust bearing surfaces on the shaft.

20. The gas dynamic pressure bearing set forth in claim 19, further comprising a region disposed near the end portion of the dynamic pressure generating grooves of the thrust dynamic pressure bearing in which no dynamic pressure generating grooves are formed therein; wherein:

an interval between the thrust bearing surfaces of the thrust dynamic pressure bearing is fixed along the entire length thereof; and the communicating pathway opens to the gap of the radial dynamic pressure bearing at a point between the two sets of dynamic pressure generating grooves.

21. The gas dynamic pressure bearing set forth in claim 20, wherein the two thrust bearing surfaces on the shaft are perpendicular to a central axis of the shaft and extend outward therefrom, and face each other in the axial direction.

22. The gas dynamic pressure bearing set forth in claim 19, wherein the two thrust bearing surfaces on the shaft are perpendicular central axis of the shaft and extend outward therefrom, and face each other in the axial direction.

23. A spindle motor, comprising:

the gas dynamic pressure bearing set forth in claim 19;

a hub on which a recording disk can be mounted and supported so as to be freely rotatable by means of the gas dynamic pressure bearing; a rotor magnet that rotates integrally with the hub; and a stator that faces the rotor magnet and rotatively drives the rotor magnet.

24. A recording disk drive device, comprising:

a housing;

the spindle motor set forth in claim 1, the spindle motor fixed to the housing;

a recording disk that is fixed to the hub and can record data; and a data access means for reading data to and reading data from required positions on the recording disk.

* * * * *